May 7, 1946.  A. BENSKIN  2,399,850
DUST PAN
Filed April 27, 1945
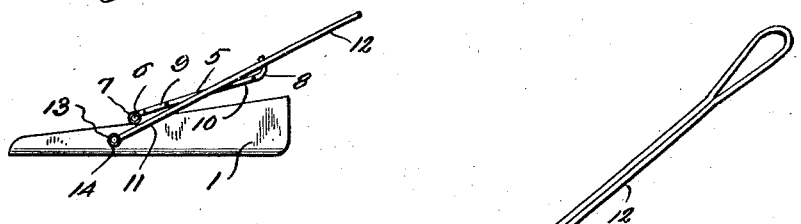
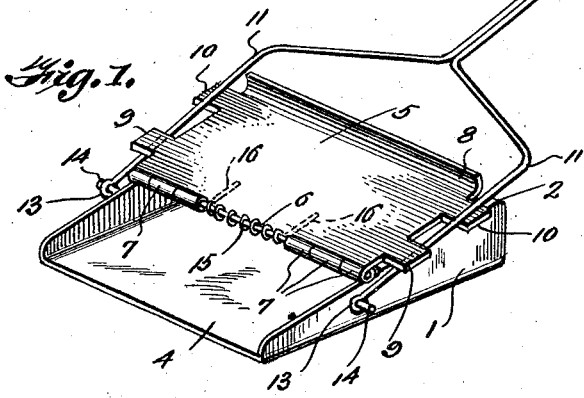
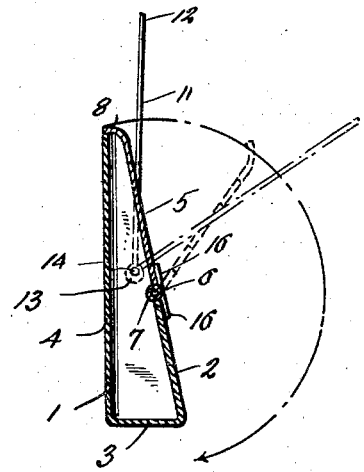
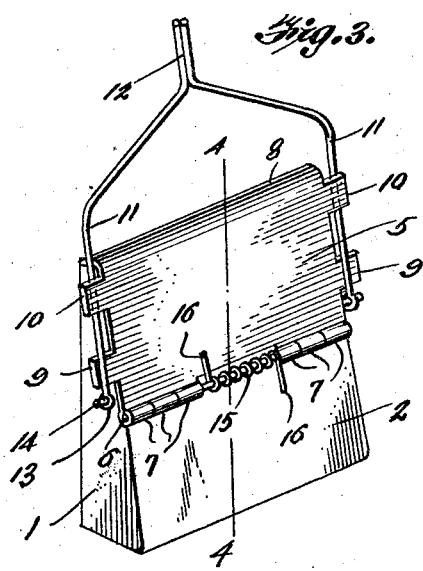
INVENTOR
ANNETTE BENSKIN
BY *Ross J. Woodward*
ATTORNEY Patented May 7, 1946

2,399,850

UNITED STATES PATENT OFFICE 2,399,850

DUSTPAN

Annette Benskin, El Dorado Springs, Mo.

Application April 27, 1945, Serial No. 590,529

1 Claim. (Cl. 65—20)

This invention relates to a dustpan and it is one object of the invention to provide a pan which is pivoted to a handle in order that the pan may move from a horizontal position for use to a vertical position in which it is carried from one place to another, there being a cover for the pan which moves from closed position to open position when the pan is swung to horizontal position.

Another object of the invention is to provide a cover having a spring which urges the cover toward closed position and causes it to be held tightly closed while the pan is in its vertical position and being carried about.

Another object of the invention is to so form the free end of the cover that, when it is in closed position, the free end of the cover will constitute a lip which overlaps the front end of the pan and very effectively closes the same.

Another object of the invention is to provide a cover having at its opposite sides tongues for engaging arms or forks of the handle and thus permitting the arms to impart opening and closing movement to the cover as the pan swings to open position or closed position.

Another object of the invention is to provide a dust pan which is simple in construction, very efficient in operation, and which may be cheaply manufactured and sold at a low price.

The invention is illustrated in the accompanying drawing, wherein:

Fig. 1 is a perspective view of the improved dust pan.

Fig. 2 is a side elevation showing the pan in position for use.

Fig. 3 is a perspective view showing the pan in closed position.

Fig. 4 is a sectional view taken vertically through the closed dust pan, on the line 4—4 of Fig. 3.

The improved dust pan has a pan or receptacle 1, preferably formed of sheet metal but which may be formed of any other suitable material. This pan gradually decreases in depth toward its front end and has a sloping upper wall 2 extending from its rear wall 3 and terminating substantially midway the length of the pan so that the pan will be open at its front and also open along its top for a portion of its length. Since the pan has a flat rear wall 3 of appreciable length and width, the pan may be set at rest upon this rear wall when in an upright position and it will not be liable to turn over. When the pan is disposed in a horizontal position for use, it rests upon its flat bottom, as shown in Fig. 1 and dirt and trash may be readily swept into the pan through the open front.

In order to close the open front end portion of the pan, there has been provided a cover 5 which is also formed of sheet metal and is pivoted upon a pin 6 which passes through companion hinge sleeve 7 formed along meeting edges of the cover and the upper wall 2. The free end of the cover is curved and forms a lip 8 which overlaps the front edge of the bottom of the pan and forms a tight closure when the cover is in its closed position. This is clearly shown in Fig. 4. Side edge portions of the cover rest against upper edges of the side walls of the pan when the cover is closed. Tongues 9 and 10 project laterally from opposite side edges of the cover in spaced relation to each other longitudinally thereof and between these tongues pass the arms or forks 11 of a handle 12. This handle is formed of strong wire which is doubled to form the handle and has its end portions bent to form the forks, ends of the forks being formed into eyes 13 through which pass pins 14 carried by side walls of the pan so that the handle may be swung about the pins from the position of Figs. 1 and 2 to that shown in Figs. 3 and 4. By having the forks pass between the tongues 9 and 10, they may exert pushing action as the handle and pan are swung relative to each other and the cover will be moved toward open position as the pan moves toward the horizontal position and moved toward closed position as the pan moves toward a vertical position. A helical spring 15, which is coiled about the pin 6, terminates in end extensions 16 which bear against the cover and the top wall. The spring urges the cover toward its closed position and causes the cover to have close contacting engagement with edges of the side walls of the pan and the lip 8 to tightly close the front end of the pan.

What is claimed is:

A dust pan comprising a pan having a bottom and a top and side and rear walls, said top terminating in spaced relation to the front end of the pan to provide an open front end portion for the pan, a cover hinged to the front end of said top and having its free front end portion bent downwardly and forming a lip engaging the front end of the bottom when the cover is closed, a spring urging said cover toward its closed position, tongues extending from opposite side edges of said cover and spaced from each other longitudinally thereof, pins projecting outwardly from the side walls in spaced relation to their front ends, and a handle having forks at its front end extending between the tongues at sides of said cover and terminating in eyes engaged about said pins and pivotally connecting the handle with the pan.

ANNETTE BENSKIN.